United States Patent [19]

Long et al.

[11] Patent Number: 5,979,731
[45] Date of Patent: Nov. 9, 1999

[54] METHOD AND APPARATUS FOR PREVENTING CREASES IN THIN WEBS

[75] Inventors: Michael Long, Rochester; James Arthur White, Conesus, both of N.Y.

[73] Assignee: Eastman Kodak Company, Rochester, N.Y.

[21] Appl. No.: 08/959,920

[22] Filed: Oct. 29, 1997

Related U.S. Application Data

[63] Continuation of application No. 08/630,226, Apr. 10, 1996, abandoned, which is a continuation of application No. 08/320,087, Oct. 7, 1994, abandoned.

[51] Int. Cl.⁶ .................................................. B65H 20/14
[52] U.S. Cl. ............................. 226/7; 226/21; 226/97.1; 226/196.1
[58] Field of Search ............................. 226/7, 97, 196.1, 226/95, 168, 93, 21, 3

[56] References Cited

U.S. PATENT DOCUMENTS

| | | | |
|---|---|---|---|
| 3,125,265 | 3/1964 | Warren et al. | 226/97 X |
| 3,650,043 | 3/1972 | Overly et al. | 34/156 |
| 3,830,143 | 8/1974 | Dowd, Jr. | 93/84 |
| 3,907,186 | 9/1975 | Hasler | 226/7 |
| 3,912,144 | 10/1975 | Arseneault et al. | 226/97 X |
| 3,912,186 | 10/1975 | Bruck et al. | 226/97 X |
| 3,918,092 | 11/1975 | Rueger | 226/97 X |
| 4,182,472 | 1/1980 | Peekna | 226/97 |
| 4,200,211 | 4/1980 | Yamagishi et al. | 226/21 |
| 4,605,146 | 8/1986 | Petitjean | 226/97 |
| 4,700,909 | 10/1987 | Lohrenz et al. | 242/182 |

FOREIGN PATENT DOCUMENTS

| | | | |
|---|---|---|---|
| 0028152 | 3/1981 | Japan | 226/97 |
| 2-117552 | 5/1990 | Japan . | |
| 2096974 | 4/1981 | United Kingdom | 226/97 |
| 2096974 | 10/1982 | United Kingdom | 226/97 |

*Primary Examiner*—Donald P. Walsh
*Assistant Examiner*—Emmanuel M. Marcelo
*Attorney, Agent, or Firm*—Clyde E. Bailey, Sr.

[57] ABSTRACT

Method and apparatus for removing temporary longitudinal wrinkles (29) from a thin or ultra-thin moving web (11) in a web conveyance machine by bending the web through preferably at least 90 degrees around a cylindrical small-radius air bar (13, 35, 39, 61, 63, 65, 73, 79) and for preventing permanent creases from forming in the web by disposing the air bar with the wrinkle-free web in close proximity to the surface of a contact roller (33, 53, 67, 71) and transferring the moving web across a gap (62) of preferably 1 mm or less between the air bar and the contact roller.

16 Claims, 4 Drawing Sheets

METHOD AND APPARATUS FOR PREVENTING CREASES IN THIN WEBS

This is a Continuation of application Ser. No. US 08/630,226, filed Apr. 10, 1996, which is a Continuation of application Ser. No. 08/320,087, filed Oct. 7, 1994.

FIELD OF THE INVENTION

The invention concerns methods and apparatus for conveying webs, particularly for conveying thin and ultra-thin webs, and more particularly for preventing formation of creases in these webs when conveyed through machines requiring roller contact with webs.

BACKGROUND OF THE INVENTION

Rollers have been used for many years to convey webs through machines in a wide variety of processes, for example, in photographic film sensitizing, magnetic film coating, and the manufacture of plastic films of polyethylene and poly(ethylene terephthalate). Webs having a thickness above about 0.05 mm can be conveyed without wrinkles or creases by well-known contact roller conveyance technology. By "wrinkles" is meant longitudinally-oriented, smooth, transverse undulations in a web which are evoked by tension imbalances and which are not permanent deformations. By "creases" is meant longitudinally-oriented, abrupt, permanent deformations in a web. Webs having thicknesses above about 0.05 mm typically have sufficient beam or transverse compressional strength that they can adjust laterally on a roller surface to local transverse tension imbalances and therefore will pass conformably over the roller surface. These webs are said to be competent.

Demand for, for example, higher film and magnetic volumetric data storage densities and smaller electrical capacitors has led to a need for thinner and thinner webs, and such webs tend to be significantly less competent. Roller conveyance machines inherently exert more longitudinal tension than transverse tension on a web, and less competent webs respond by wrinkling longitudinally. The higher the discrepancy between longitudinal and transverse tension, the greater will be the severity of the wrinkles. Moderate undulations in unsupported web spans between rollers are not a problem in and of themselves except that they may cause the apparent width of the web to decrease, leading to web guiding or tracking problems. Serious problems can arise, however, when wrinkles come into contact with the cylindrical surface of a roller or a winding roll of web. The transverse cylindrical bending of the web will promote flattening of wrinkles, but frictional forces between the web and the roller resist flattening. If a wrinkle does not flatten laterally but instead folds over on itself because the compressional strength of the web is inadequate to overcome the lateral frictional resistance, the web is said to be incompetent. The web will become creased and typically will be permanently deformed in an irregular longitudinal pattern. Functional layers coated on the web can be disturbed or damaged by web creasing, either prior to or after coating. A crease which is wound into a winding roll can deform many convolutions previous or subsequent to the crease.

Numerous different types of devices have been proposed to increase transverse tension in a web. Such devices include bowed and flexible ("Mt. Hope") rollers, concave rollers, convex rollers, undercut rollers, spirally-grooved rollers, and deformable rollers. Each of these devices requires good frictional contact between web and roller to develop transverse tension. Inevitably, however, a roller which is sufficiently aggressive to remove moderate wrinkles by inducing axial separation of the web edges will induce axial slipping and skidding between the web and roller when there are few or no wrinkles to remove. Further, as web speed is increased, the air film carried into the nip between web and roller causes the web to float on the roller, destroying the roller's ability to spread the web edges. This occurs at web speeds well below 300 m/min for web tensions of about 2.5 Newtons per centimeter of web width, and it is especially a problem for thin webs which must operate at tension levels such as 1 N per centimeter of web width, or for ultra-thin webs which must operate at tension levels such as 0.20 N per centimeter of web width, or less. By "thin" is meant webs having thicknesses less than 0.025 mm. By "ultra-thin" is meant webs having thicknesses less than 0.006 mm (6 $\mu$m). Another limitation of these rollers is that the energy to cause the spreading action in the web must come from the web itself if the rollers are not driven rollers. These energy losses are manifested as tension losses through the machine. Maintaining a constant tension level of, for example, 1 N/cm throughout the machine, requires that most, if not all, rollers be driven at web speed. This is impractical in many machines, some of which may utilize a thousand or more rollers.

It is an object of the invention to provide an improved method for smoothing tension-induced wrinkles from thin webs being conveyed.

It is a further object of the invention to provide improved apparatus for smoothing tension-induced wrinkles from thin webs being conveyed.

It is a still further object of the invention to provide an improved method for preventing creasing of thin webs being conveyed on contact rollers.

It is a still further object of the invention to provide improved apparatus for preventing creasing of thin webs being conveyed on contact rollers.

It is a still further object of the invention to provide an improved method for preventing creasing of thin webs being wound up.

It is a still further object of the invention to provide improved apparatus for preventing creasing of thin webs being wound up.

SUMMARY OF THE INVENTION

Briefly described, the improved methods and apparatus of the invention are useful for smoothing wrinkles and preventing creases in the conveying and winding of thin and ultra-thin webs. In a machine conveying such a web, the downstream portion of an unsupported span of web can develop longitudinally-oriented, transverse wrinkles or undulations displaying peaks and valleys above and below the average plane of the web. To cause these wrinkles to flatten, the web is wrapped transversely in off-spaced, non-contact relationship about a perforate air conveyance element, commonly known as an "air bar," bending the web from its former nominally planar direction through an angle of at least 80 degrees and preferably about 180 degrees. Thinner webs require higher wrap angles. The perforate air bar is constructed and supplied internally with air at preferably about 34 kPa to present a highly-uniform cushion of air to the web across the entire web width. The radius of wrap is small relative to the radius of known air bars for general air conveyance, being desirably less than 50 mm and preferably less than 25 mm. The web tension is relatively low, as is known for conveyance of thin and ultra-thin webs, being preferably about 100 g per centimeter of web width, or less. Preferably, the air bar is formed from a cylinder of sintered-particle metal or plastic filter media, although rigid tubing suitably perforated can also be used. Transverse cylindrical bending of the web tends to flatten the web, and the air bar acts like a "zero-friction" roller with no significant lateral resistance to flattening.

While the web is moving in a substantially arcuate path, longitudinal wrinkling is suppressed. We have found that in this state, the web can be beneficially transferred to a roller surface or to a winding roll of the web without wrinkles or creases. The air bar must be in close proximity to the transfer surface, however, since wrinkles tend to reform in the web when the web is no longer cylindrically constrained nor supported. Therefore, spacing between the air bar and the roller or winding roll in the vicinity of the web transfer is less than 10 mm and preferably is about 1 mm.

BRIEF DESCRIPTION OF THE DRAWINGS

The foregoing and other objectives, features, and advantages of the invention will be apparent from the following more particular description, including the presently preferred embodiment of the invention, as illustrated in the accompanying drawings in which.

DETAILED DESCRIPTION OF THE INVENTION

Figure 1:
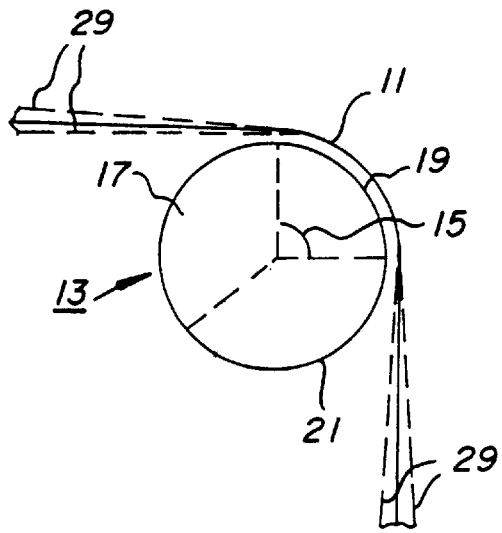
FIG. 1 shows a schematic elevational cross-section of an embodiment in accordance with the invention having a 90 degree arc of web wrap, taken along line 1—1 in FIG. 3.
Figure 3:
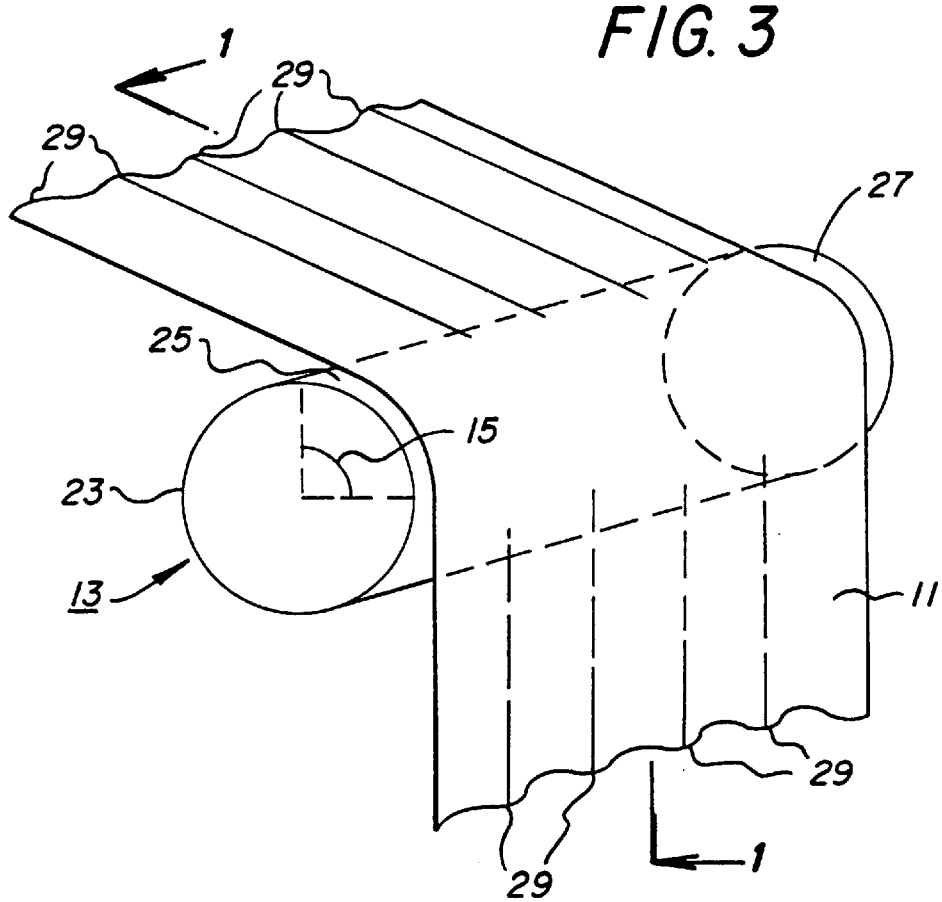
FIG. 3 shows a schematic isometric view of the embodiment shown in FIG. 1.

In FIG. 1, a moving thin web 11 is shown wrapped around and off-spaced from a perforate air conveyance element, or air bar, 13 having a convex arcuate surface (typically cylindrical). Web 11 can be spaced from the conveyance element,or air bag 13 by up to 2 mm. The web can have a thickness of, for example, 0.006 mm, and be moving at a speed of, for example, 150 m/min under a tension of about 100 g per centimeter of web width. The angle, or arc, of web wrap 15 is approximately 90 degrees. The air bar shown has a radius of preferably 25 mm (16) and is disposed in the web path of a web conveyance machine (not shown), preferably transverse to the direction of web travel as shown in FIG. 3, is closed at both ends, and is adapted to be supplied to its interior 17 with pressurized air or other gas. The pressurized air passes through porous air bar wall 19 to the exterior adjacent to web 11 at a controlled rate and a substantially uniform flow per unit area of porous wall, creating a dimensionally uniform dynamic cushion of air which supports moving web 11 at a substantially fixed and close spacing. Wall areas 21 not adjacent to web 11 and not involved in conveying web 11 are preferably non-porous to conserve air and power, including back side area 23 and margins 25 and 27, respectively, outboard of web 11. Air bar 13 can be formed from a sintered-particle metal tube having a nominal pore size of 7–10 μm such as is available from Mott Metallurgical Corp., Farmington, Conn., U.S.A. A corrosion-resistant metal such as 316L stainless steel is preferred. Alternatively, a sintered-particle plastic tube can be used, formed of material such as nylon, polysulfone, polycarbonate, or poly(tetrafluoroethylene), such as is available from Porex Technologies, Fairburn, Ga., U.S.A. Both types of tubes are effective in conveying web. The plastic tube is significantly less expensive and can economically be discarded if it becomes clogged. However, in applications requiring a relatively long air bar, the metal tube is preferred for its lack of sag.

In FIGS. 1 and 3, web 11 is shown having transverse undulations or wrinkles 29 both entering and leaving the web in wrapped relationship with air bar 13. Bending the web through a 90 degree arc and supporting it uniformly and with zero lateral friction causes wrinkles 29 to flatten out as the web path becomes substantially cylindrical. Wrinkles 29 are seen to reform when the web is no longer moving cylindrically.

The rate at which the web must bend to follow the surface of the air bar is an important aspect of the invention. We have found that relatively small-diameter tubes are preferable. Accordingly, air bars of radius 50 mm or less show good results under the above-described conveyance conditions.

Figure 2:
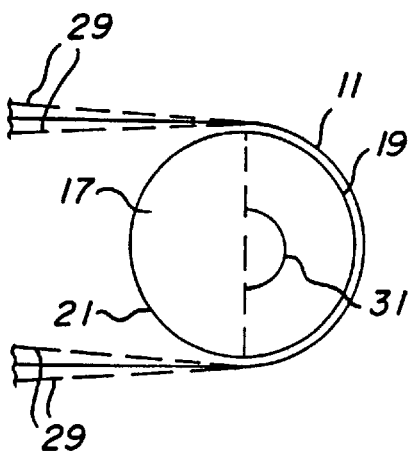
FIG. 2 shows a schematic elevational cross-section of another embodiment in accordance with the invention having a 180 degree arc of web wrap.

For ultra-thin webs, 0.006 mm or less in thickness, and for speeds of up to 600 m/min or even higher, increased wrap angle provides a longer cylindrical path and a longer time for relaxation of wrinkles. As shown in FIG. 2, a wrap angle 31 and air bar wall porosity segment of approximately 180 degrees can be used, or even larger if machine geometries permit. Also, smaller radius air bars are preferable, for example, 25 mm or even less.

Figure 4:
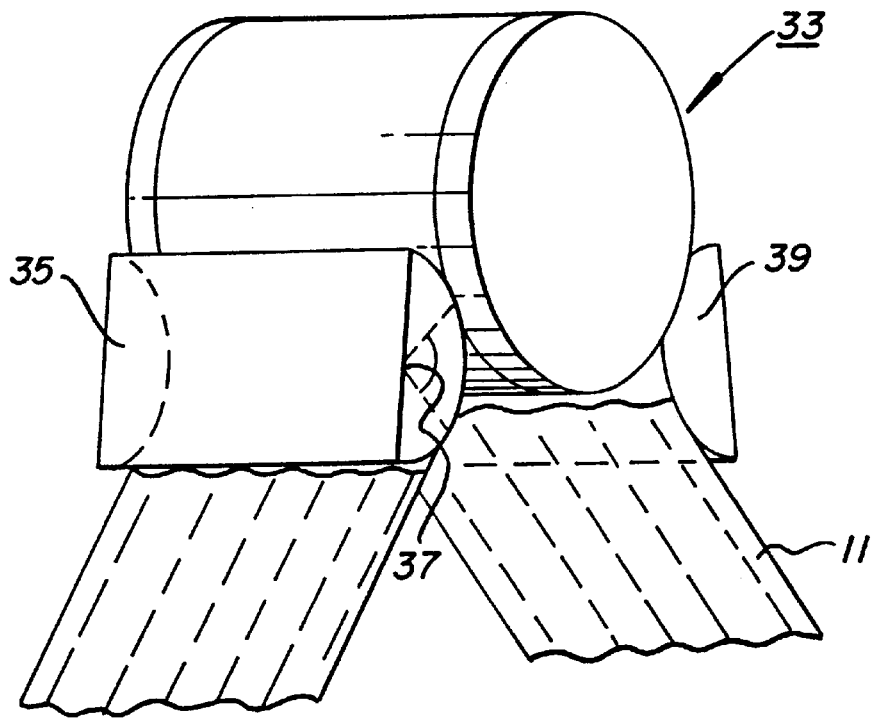
FIG. 4 shows a schematic isometric view of another embodiment in accordance with the invention having air bars adjacent to a contact roller.

Web conveying machines typically have roller elements which must contact the web at one or more locations in the web path. For instance, in large machines, drive or torque rollers grip and impel the web at successive locations in the machine to restore tension lost to friction upstream. It is very difficult in known conveyance designs to lay a thin or ultra-thin web smoothly and free of wrinkles onto such a contact roller when the web entering upon the roller is wrinkled. We have found that a highly effective way to do this is to first flatten the web as just described and to then transfer it immediately to the desired contact roller before wrinkles have time and distance to reform. FIG. 4 shows a contact roller 33 having web 11 wrapped smoothly upon it without wrinkles or creases. Roller 33 can be, for example, a suction feed drive roller, or metering drum, of known design (vacuum supply and drive not shown). Wrinkled web 11 passes over entering air bar 35, which is shown for economy and convenience as a hemicylinder. Air bar 35 is pressurized internally at 34 kPa as described above. Web 11 is supported over about 90 degrees of wrap (angle 37) with air bar 35 and then is transferred immediately to the surface of roller 33. Air bar 35 is preferably spaced about 1 mm or less from roller 33. A second air bar 39 is shown where web 11 leaves roller 33. Alternatively, a conventional roller could be used instead of the second air bar.

Figure 5:
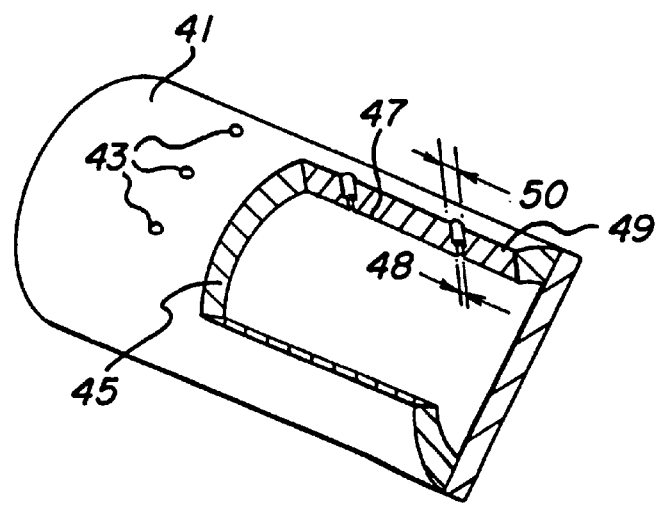
FIG. 5 shows a cutaway view of an alternate construction of an air bar in accordance with the invention.

It is an important aspect of the invention that the air cushion be highly uniform. As shown in FIG. 5, air bars also can be formed from solid-wall tubing 41. Preferably, randomly-spaced ports or holes 43 are provided through the tubing wall 45 in sufficient number and tapered from the inside 47 (for example, 0.35 mm) (item 48) to the outside 49 (for example, 1.58 mm) (item 50) of the tubing to reduce air velocity and pressure variations in the cushion. Air bars formed by this procedure tend to be noisier than air bars formed from sintered-particle tubing.

Figure 6:
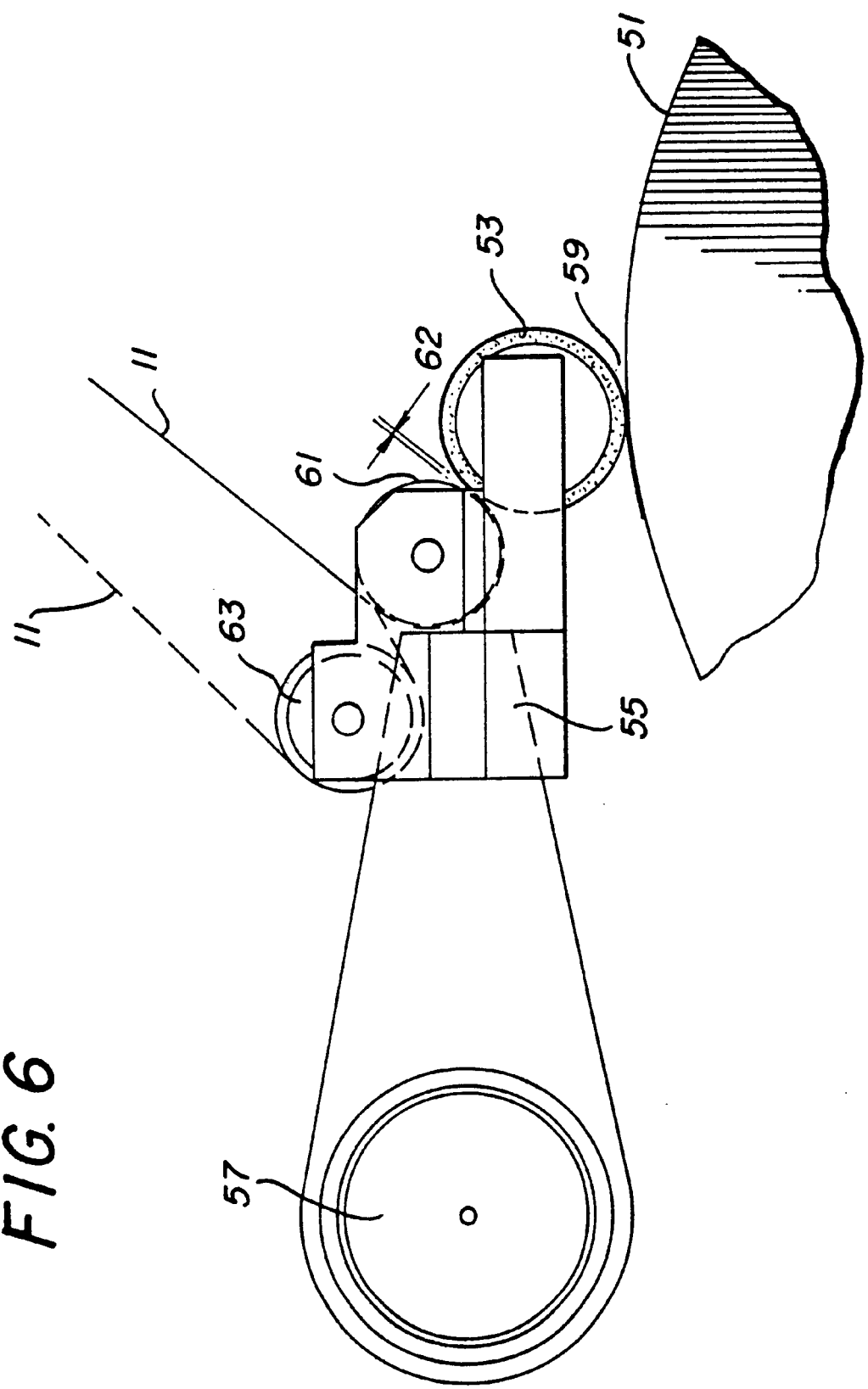
FIG. 6 shows a schematic elevational view of another embodiment in accordance with the invention having two air bars transferring flattened web to a builder roller at a web winder.

The invention is also useful in winding rolls of thin or ultra-thin webs without creases. In FIG. 6, a portion of a roll 51 is shown being wound. A builder or lay-on roller 53 is supported by an arm 55 which pivots about a journalled shaft 57 disposed on a conveyance machine (not shown). Builder roller 53 rides on the surface of roll 51, transferring web 11 continuously to winding roll 51 and acting to exclude air from the dynamic nip 59 therebetween. Smooth, wrinkle-free web is provided to builder roller 53 by fixed air bar 61 in accordance with the invention and above discussion. The web wrap is approximately 180 degrees. Air bar 61 is disposed parallel to and spaced from builder roller 53 by preferably 1 mm or less (item 62). Air bar 61 has a radius of preferably 25 mm or less. In the solid-line configuration shown in FIG. 6, web 11 wraps counterclockwise (CCW) around air bar 61, clockwise (CW) around builder roller 53, and is wound CCW onto roll 51. If desired to wind roll 51 CW, a second air bar 63 can be added and the web wrapped CCW around the second air bar, then CW around the first air bar, then CCW around the builder roller, as shown in the dashed-line configuration in FIG. 6.

Figure 7:
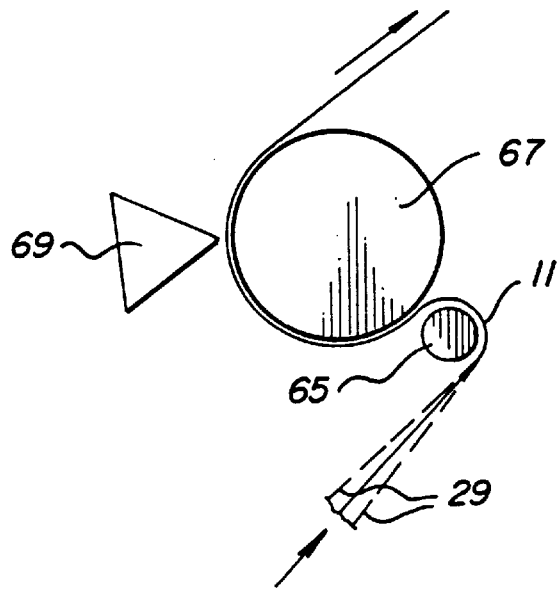
FIG. 7 shows a schematic elevational cross-section of another embodiment in accordance with the invention using an air bar to transfer flattened web to a hopper coating roller.
Figure 8:
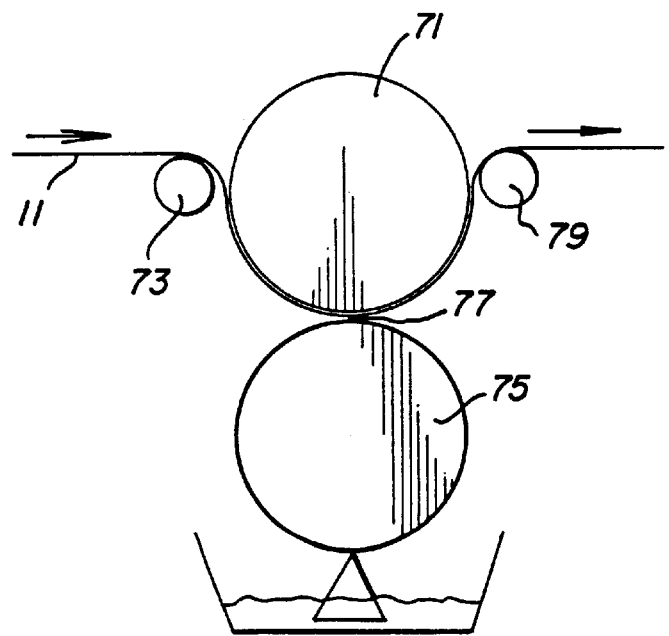
FIG. 8 shows a schematic elevational cross-section of another embodiment in accordance with the invention using an air bar to transfer flattened web to a gravure coater.

The invention is useful in other machine applications requiring reliable, wrinkle-free placement of thin or ultra-thin web onto a roller. FIG. 7 shows an air bar 65 in accordance with the invention as described hereinabove being used to provide web 11 to a coating backing roller 67 for subsequent liquid coating by hopper 69. FIG. 8 shows similar air bars used to provide web 11 to a gravure coating backing roller 71. Web 11 passes over entering air bar 73, is transferred wrinkle-free to coating backing roller 71 which presses web 11 into contact with gravure roller 75 at nip 77, and passes over exiting air bar 79.

From the foregoing description, it will be apparent that there has been provided improved methods and apparatus for smoothing tension wrinkles and preventing the formation of creases in a thin web being conveyed or transferred to a contact roller in a web conveying machine. Variations and modifications in the herein described methods and apparatus, within the scope of the invention, will undoubtedly suggest themselves to those skilled in the art. Accordingly, the foregoing description should be taken as illustrative and not in a limiting sense.

Parts List 11 thin web
13 air bar in FIG. 1
15 angle of wrap in FIG. 1
17 interior of 13
19 porous wall of 13
21 non-porous wall of 13
23 backside of area 21
25 left margin of 13
27 right margin of 13
29 wrinkles
31 angle of web wrap in FIG. 2
33 roller in FIG. 4
35 entering air bar in FIG. 4
37 angle of web wrap in FIG. 4
39 exiting air bar in FIG. 4
41 solid wall tubing
43 randomly spaced holes
45 tubing wall
47 inside of 41
48 inside hole diameter
49 outside of 41
50 outside hole diameter
51 winding roll
53 builder roll
55 arm
57 journalled shaft
59 dynamic nip
61 first air bar in FIG. 6
62 air bar spacing in FIG. 6
63 second air bar in FIG. 6
65 air bar in FIG. 7
67 hopper coating backing roller
69 hopper
71 gravure coating backing roller
73 entering air bar in FIG. 8
75 gravure roller
77 nip in FIG. 8
79 exiting air bar in FIG. 8

What is claimed is:

1. A method for preventing the formation of creases in a web comprising the steps of:

a) conveying said web in a path through an apparatus having a roller in contact with said web;

b) providing a perforated air conveyance element transverse to the direction of web movement so as to be substantially perpendicular to said direction of web movement and upstream of said roller, said element having a convex arcuate surface with an arc of at least 80 degrees and a radius of curvature of up to 50 mm;

c) wrapping a web in a first direction about said perforated air conveyance element forming a first wrapping having an entering point and an exiting point on said convex arcuate surface, said first wrapping having an arc length of at least 80 degrees between said entering point and said exiting point;

d) wrapping said web in a second direction opposite said first direction about a roller forming a second wrapping;

e) frictionally engaging said roller about said second wrapping with said web;

f) positioning said element to be substantially parallel to said roller and spaced apart from said roller by a distance of less than about 10 mm.

2. The method in accordance with claim 1 wherein said element is positioned less than 2 mm from said roller.

3. The method in accordance with claim 1 wherein said web is less than 50 µm in thickness.

4. The method in accordance with claim 1 wherein said web is less than 5 µm in thickness.

5. The method in accordance with claim 1 wherein said web is positioned from said element by up to 2 mm.

6. The method in accordance with claim 1 wherein said perforated air conveyance element comprises a sintered-particle material.

7. The method in accordance with claim 6 wherein said sintered-particle material includes a sintered-particle plastic tube.

8. The method in accordance with claim 1 wherein said perforated air conveyance element includes a ported tube.

9. A method for smoothing a web, comprising the steps of:
a) providing a perforated air conveyance element transverse to the direction of web movement so as to be substantially perpendicular to said direction of web movement, said element having a convex arcuate surface with an arc of at least 80 degrees and a radius of curvature of up to 50 mm;
b) positioning said perforated air conveyance element to be substantially parallel to a roller and spaced apart from said roller by a distance of less than about 10 mm;
c) wrapping said web in a first direction about said perforated air conveyance element through an arc of at least 80 degrees;
d) wrapping said web in a second direction opposite said first direction about said roller;
e) frictionally engaging said roller with said web.

10. The method in accordance with claim 9 wherein said arc is about 180 degrees, said radius is about 25 mm, and said spacing of said web from said element is about 1 mm.

11. Apparatus for preventing the formation of creases in a traveling web, said apparatus comprising:
a) a perforated air conveyance element transverse to the direction of web movement so as to be substantially perpendicular to said direction of web movement, said element having a convex arcuate surface with an arc of at least 80 degrees and a radius of curvature of up to 50 mm;
b) a roller positioned substantially parallel to said perforated air conveyance element at a distance of less than about 10 mm from said perforated air conveyance;
c) a traveling web wrapped in a first direction about said perforated air conveyance element to form a first wrapping, and then in a second direction opposite said first direction about said roller to form a second wrapping, said first wrapping forming an arc of at least 80 degrees about said perforated air conveyance element, said second wrapping frictionally engaging said roller.

12. The apparatus in accordance with claim 11 wherein said perforated air conveyance element comprises a sintered-particle material.

13. The apparatus in accordance with claim 12 wherein said sintered-particle material includes a sintered-particle plastic tube.

14. The apparatus in accordance with claim 11 wherein said perforated air conveyance element includes a ported tube.

15. The apparatus in accordance with claim 11 wherein said arc is about 180 degrees, said radius of curvature is about 25 mm, and said distance of said roller from said perforated air conveyance element is about 1 mm.

16. Apparatus for removing longitudinally-oriented wrinkles from a moving web, said apparatus comprising:
a perforated air conveyance element transverse to the direction of web movement, said element having a convex arcuate surface adjacent to and off-spaced from said web about which said web is wrapped, said surface having an arc of at least 80 degrees and a radius of curvature of up to 50 mm;
a roller positioned substantially parallel to said perforated air conveyance element at a distance of less than 10 mm from said perforated air conveyance;
a traveling web wrapped in a first direction about said perforated air conveyance element, said traveling web supported on air emitted through said perforated air conveyance element, said traveling web wrapped in a second direction opposite said first direction about said roller, said traveling web frictionally engaging said roller.

* * * * *